United States Patent
Zhang et al.

(10) Patent No.: US 12,130,143 B1
(45) Date of Patent: Oct. 29, 2024

(54) SEMANTIC REPRESENTATION AND OUTLIER DETECTION FOR AIRPORT SURFACE TRAJECTORY

(71) Applicant: BEIHANG UNIVERSITY, Beijing (CN)

(72) Inventors: Xiaoxiao Zhang, Beijing (CN); Yang Yang, Beijing (CN); Zhihao Gao, Beijing (CN); Minghua Zhang, Beijing (CN); Kaiquan Cai, Beijing (CN)

(73) Assignee: BEIHANG UNIVERSITY

( * ) Notice: Subject to any disclaimer, the term of this patent is extended or adjusted under 35 U.S.C. 154(b) by 0 days.

(21) Appl. No.: 18/648,109

(22) Filed: Apr. 26, 2024

(30) Foreign Application Priority Data

Jan. 11, 2024 (CN) .......................... 202410043986.4

(51) Int. Cl.
   *G01C 21/30* (2006.01)
(52) U.S. Cl.
   CPC .................................... *G01C 21/30* (2013.01)
(58) Field of Classification Search
   CPC ...... G01C 21/30; G01C 23/005; G08G 5/025; G08G 5/0043; G08G 5/0026; G08G 5/0021; G08G 5/0013; G08G 5/0065; G08G 5/065; B64F 1/002; G01S 13/933
   See application file for complete search history.

(56) References Cited

U.S. PATENT DOCUMENTS

| | | | | |
|---|---|---|---|---|
| 5,374,932 A | * | 12/1994 | Wyschogrod | G01S 13/91 342/39 |
| 5,519,618 A | * | 5/1996 | Kastner | G08G 5/065 701/120 |

* cited by examiner

*Primary Examiner* — Abby Y Lin
*Assistant Examiner* — Dylan M Katz
(74) *Attorney, Agent, or Firm* — Jose Cherson Weissbrot

(57) ABSTRACT

An airport surface semantic path representation and an outlier taxiing pattern detection method for airport operation management, semantic conversion is realized based on dynamic features in an aircraft taxiing process, and after combining with surface map topology information, an airport surface aircraft semantic path representation is obtained; road segment geographic information is used to allocate a road segment weight to improve a longest common sub-sequence method, thereby constructing a flight path similarity matrix and using hierarchical clustering to realize surface taxiing pattern recognition; finally, by calculating the internal similarity of the identified patterns, the maximum outlier for identifying outlier patterns is obtained; after calculating the similarity between subsequent input flight paths and each pattern, as well as comparing a corresponding outlier with the maximum reachable outlier, the prewarning of outlier flight paths is achieved, the safety of surface management is ensured, and the effective surface control is realized.

9 Claims, 2 Drawing Sheets

---

Step 1: obtaining a plurality of aircraft semantic path representations based on a scene monitoring radar system and a map matching method;

Step 2: obtaining a plurality of aircraft scene taxiing modes based on the plurality of aircraft semantic path representations and hierarchical clustering;

Step 3: constructing a semantic path outlier, and performing abnormal detection on the aircraft scene taxiing modes based on the semantic path outlier;

SEMANTIC REPRESENTATION AND OUTLIER DETECTION FOR AIRPORT SURFACE TRAJECTORY

TECHNICAL FIELD

This invention generally relates to the technical field of airport operation management, and more particularly, to an airport surface semantic path representation and outlier taxiing pattern detection method.

BACKGROUND

The continuous progress of transportation leads to rapid growth of airport traffic flow. The contradiction between an increased airport traffic demand and a limited traffic capacity becomes increasingly sharp, making the improvement of the airport operation efficiency and the outlier detection during the taxiing process of aircrafts an urgent problem in airport operation management. Various tasks for improving airport operation efficiency and detecting taxiing anomalies (e.g., determining an aircraft's deviation from a taxiway, warning an invasion to a runway, and arranging runway operations) rely on simplified representations of typical aircraft taxiing paths. Although these tasks may be completed by performing clustering or manual designation on taxiing path points, significant noise problems relating to the missing of data and deviation of original flight path sampling points, as well as possible accuracy errors in manual labeling have become huge challenges in this field.

In response to the aforementioned challenges, a novel semantic representation for airport surface trajectory has been proposed, enabling outlier detection in taxiing pattern using this semantic representation. However, challenges persist in both the construction of such aircraft semantic trajectories representation and further outlier detection in taxiing pattern. 1) the incomplete original field monitoring path data, severe deviation, high density of airport surface road network, complex structure and difficulty of solving noise problems in the associated process results in a failure of accurately obtaining the semantic path representations conforming to real aircraft operation features; 2) the aircraft semantic paths are represented in a form of map road segment numbers; how to calculate the similarity between flight paths (i.e. the possibility of belonging to a same pattern) based on the geographical information implied by the numbers, and how to identify the taxiing patterns included in the flight paths based on the accuracy requirements differentiated by the patterns are problems needing to be solved; 3) how to define outlier taxiing patterns while achieving real-time pattern recognition and outlier detection of input paths after obtaining the differentiation of taxiing patterns between existing trajectories is also a problem needing to be solved.

SUMMARY

The purpose of the present invention is to provide an airport surface semantic path representation and an outlier taxiing pattern detection method. According to the present invention, semantic conversion is realized based on digital surface map topology information, and after combining with the dynamic features in an aircraft taxiing process, an airport surface aircraft semantic trajectory representation is obtained. On this basis, road segment geographic information is used to allocate a road segment weight to improve a longest common sub-sequence method, thereby constructing a flight path similarity matrix and using hierarchical clustering to realize surface taxiing pattern recognition; finally, by calculating the internal similarity of the identified patterns, the maximum outlier for identifying outlier patterns is obtained; after calculating the similarity between subsequent input flight paths and each pattern, as well as comparing a corresponding outlier with the maximum reachable outlier, the prewarning of outlier flight paths is achieved, the safety of surface management is ensured, and the effective surface control is realized.

To achieve the above purpose, the present invention adopts the following technical solution: an airport surface semantic path representation and an outlier taxiing pattern detection method, comprising the steps of:

Step 1: obtaining a plurality of aircraft initial taxiing paths based on a surface monitoring radar system, and obtaining a plurality of pieces of aircraft taxiing path data by means of map matching by using the plurality of aircraft initial taxiing paths;

Obtaining a plurality of initial aircraft semantic path representations by using the plurality of pieces of aircraft taxiing path data;

Performing cleaning and integrity verification on the plurality of initial aircraft semantic path representations based on the division of parking positions, thereby obtaining a plurality of aircraft semantic path representations;

Preferably, obtaining a plurality of initial aircraft semantic path representations, specifically comprising:

Step 11: obtaining a plurality of aircraft initial taxiing paths based on a surface monitoring radar system under a constraint condition of the aircraft semantic path representations;

It is worth mentioning that, the plurality of aircraft taxiing paths are obtained according to the take-off/landing behaviors;

Establishing airport contour coordinates by means of map matching, and deleting noise path points in the plurality of aircraft initial taxiing paths by using the airport contour coordinates, thereby obtaining a plurality of pieces of aircraft taxiing path data;

Generating a plurality of aircraft taxiing path point sequences based on the plurality of pieces of aircraft taxiing path data;

Step 12: taking all road segments in a road network as candidate road segments, and establishing a candidate road segment set, wherein a first path point in each aircraft taxiing path point sequence starts from a runway end, and each aircraft taxiing path point sequence comprises a plurality of runway ends and parking position ends;

Step 13: selecting a c-th aircraft taxiing path point sequence, wherein c=1, 2, 3 . . . . C, and C represents a total number of aircraft taxiing path point sequences;

Obtaining an initial path point $c_1$ of the c-th aircraft taxiing path point sequence, and obtaining a minimum projection distance from the initial path point $c_1$ to each candidate road segment in the candidate road segment set by means of a Euclidean distance method, thereby obtaining a plurality of projection distances corresponding to the initial path point $c_1$;

Step 14: setting a maximum error distance $d_{max}$ of the aircraft semantic path point; comparing and screening the maximum error distance of the aircraft semantic path point and the plurality of projection distances corresponding to the initial path point $c_1$, and screening out a plurality of candidate projection distances of the initial path point $c_1$;

Sorting the plurality of candidate projection distances of the initial path point $c_1$ to obtain sorted candidate projection distances; representing the minimum candidate projection distance in the sorted candidate projection distances as a road segment matched with the initial path point $c_1$;

Further, the plurality of candidate projection distances of the initial path point $c_1$ are the corresponding candidate projection distances of the initial path point when the plurality of projection distances corresponding to the initial path point $c_1$ are less than the maximum error distance $d_{max}$ of the aircraft semantic path point;

Step 15: letting a=1, wherein when a=1, the point is an initial path point, wherein a=1, 2, 3 . . . . A, and A represents a total number of path points of the c-th aircraft taxiing path point sequence;

Step 16: obtaining the path point $c_{a+1}$ of the c-th aircraft taxiing path point sequence; screening out the candidate road segments having a topological relationship with the road segments matched with the trajectory point $c_{a+1}$ by means of the topological information of the road network, thereby obtaining a candidate road segment list;

Obtaining a plurality of projection distances corresponding to the path point $c_{a+1}$ based on the candidate road segment list;

Step 17: comparing, screening and sorting the maximum error distance of the aircraft semantic path point and the plurality of projection distances corresponding to the path point $c_{a+1}$, obtaining sorted candidate projection distances of the path point $c_{a+1}$, and representing a road segment having the shortest candidate projection distance in the sorted candidate projection distances as a matched road segment corresponding to the path point $c_{a+1}$;

Step 18: verifying the matched road segment result corresponding to the path point $c_{a+1}$ by using the constraint condition of the aircraft semantic path representation; if so, obtaining correct matched road segments corresponding to the path point $c_{a+1}$ and entering step 19, and if not, returning to step 17; deleting the matched road segments corresponding to an incorrect path point $c_{a+1}$ from the sorted candidate projection distances of the path point $c_{a+1}$, thereby obtaining the sorted candidate projection distances of an updated path point $c_{a+1}$; subsequently, traversing the sorted candidate projection distances of the updated path point $c_{a+1}$, thereby obtaining correct matched road segments corresponding to the path point $c_{a+1}$;

Step 19: comparing a+1 with A, and if a+1=A, ending the calculation of the aircraft semantic path representation, thereby obtaining matched road segments corresponding to the plurality of path points in the c-th aircraft taxiing path point sequence; generating a complete map matching result of the flight path based on the matched road segments corresponding to the plurality of path points, and performing deduplication processing on the complete map matching result of the flight path, thereby obtaining the c-th initial aircraft semantic path representation; if a+1<A, making a=a+1, and repeating steps 16-19;

Step 20: traversing the plurality of pieces of aircraft taxiing path data, and repeating steps 12-19 to obtain a plurality of initial aircraft semantic path representations;

It should be understood that the initial aircraft semantic flight path is expressed as a previous path point sequence represented by using road segment numbers;

Further, the formula of the projection distance is as follows:

$$D=\sqrt{(x-Q_x)^2+(y-Q_y)^2}, D<d_{MAX}$$

wherein D represents a projection distance, x represents an x coordinate axis, y represents a y coordinate axis, $Q_x$ represents an x coordinate axis of the projection point Q of the path point on a candidate road segment, $Q_y$ represents a y coordinate axis of the projection point Q of the path point on a candidate road segment, and C represents the maximum error distance $d_{MAX}$ of the aircraft semantic path point;

Preferably, the noise path points include all path points in an initial aircraft semantic path representation that are not within an airport range, and the map matching includes a geometric matching algorithm and a topological relationship algorithm;

The constraint condition of the aircraft semantic path representation includes an aircraft steering behavior angle constraint, a long-distance priority straight-going segment skipping constraint, a complex curve interpolation operation, and an anti-interference road segment point skipping constraint;

More specifically, the aircraft steering behavior angle constraint further comprising: aiming at a path point road segment matching in a complex road network at a curve, verifying the connectivity through topological information in a path point road segment matching process, and generating an included angle vector based on the endpoint coordinates; generating a vector included angle cosine value through point multiplication, obtaining a radian value of the included angle by using an inverse cosine function acos, and correcting the rationality of the aircraft steering by using the radian value;

Further, the formula of the aircraft steering behavior angle constraint is as follows:

$$\theta = \arccos\frac{(vF \cdot vB)}{\|vF\| \cdot \|vB\|}, \theta \geq 120°$$

wherein θ represents an aircraft steering angle, vF represents a vector formed by a road segment F by using head-to-tail coordinates, and ‖vF‖ represents a modulus of a corresponding vector of a road segment F, wherein vB represents a vector formed by a road segment B by using head-to-tail coordinates, vF and vB are two connected road segments, and ‖vB‖ represents a modulus of a corresponding vector of a road segment B;

Specifically, the long-distance priority straight-going segment skipping constraint, comprising: aiming at the matching difficulty caused by the low sampling frequency of the field monitoring information, if the matched road segments of adjacent sampling points are not connected in the path point road segment matching process, and when it is judged that the disconnected road segments are straight-going taxiways, performing priority straight-going segment skipping and regarding it as a smooth connection until a continuous matching is executed;

Specifically, the aircraft complex curve interpolation operation, comprising: aiming at the matching difficulty caused by a long sampling interval of an aircraft surface taxiing path at a complex curve, performing interpolation operation between a current path point and a next path point when the straight-going segment skipping cannot be performed, and increasing the density of sampling points to assist in the matching process at the complex curve;

Specifically, the anti-interference road segment point skipping constraint, comprising: aiming at the possible outlier sampling data, directly skipping a path point that cannot be matched, and continuously matching a next path point, wherein the unmatched path point means a deviation of outlier path point coordinates that make the projection distance exceed the maximum error distance of the aircraft semantic path point and result in an interruption in the matching process;

If the matching process is interrupted, returning to the time of the matching result of a previous path point, marking the wrong road segment and searching for a correct road segment again, thereby realizing the correction of the result in step 1, wherein the set frequency of continuous return does not exceed 3 times;

Preferably, in step 1, performing cleaning and integrity verification on the initial aircraft semantic path representations, specifically comprising:

Obtaining aircraft parking positions corresponding to the initial aircraft semantic path representation, and dividing the parking positions into parking position groups, thereby obtaining a plurality of parking position groups; subsequently, pushing the aircrafts in a same parking position group onto a same airport taxiway, and regarding them as a same behavior;

Establishing a key road network node of the parking position group, obtaining a node road segment serial number corresponding to the key road network node when aircrafts are pushed into or pushed out from the parking position group, and deleting the node road segment serial number corresponding to the key road network node when the aircrafts are pushed into or pushed out from the parking position group, thereby realizing the semantic path cleaning in the parking area;

Obtaining an airport runway, and selecting a key road segment at a tail end of the airport runway, thereby realizing the verification of integrity of the aircraft semantic path representation corresponding to the tail end of the runway;

Step 2: using the plurality of aircraft semantic path representations to obtain a similarity matrix of the aircraft semantic path representations, and performing hierarchical clustering on the similarity matrix of the aircraft semantic path representations, thereby obtaining a plurality of aircraft surface taxiing patterns;

Preferably, obtaining a plurality of aircraft surface taxiing patterns, specifically comprising:

Step 21: randomly selecting two aircraft semantic path representations from the plurality of aircraft semantic path representations, thereby forming pairwise aircraft semantic path sequences; subsequently, obtaining a plurality of pairwise aircraft semantic path sequences;

Preferably, the pairwise aircraft semantic path sequences comprise a first aircraft semantic path sequence and a second aircraft semantic path sequence corresponding to any selected two aircraft semantic path representations;

The first aircraft semantic path sequence comprises at least one candidate road segment, a corresponding candidate road segment number and corresponding candidate road segment coordinates;

The second aircraft semantic path sequence also comprises at least one candidate road segment, a corresponding candidate road segment number and corresponding candidate road segment coordinates;

It is worth mentioning that, the number of the candidate road segments in the first aircraft semantic path sequence and the number of candidate road segments in the second aircraft semantic path sequence are equal or unequal;

Step 22: selecting an e-th pairwise aircraft semantic path sequences, and performing calculation based on an improved longest common sub-sequence LCS, thereby obtaining a total length of the common road segments corresponding to the e-th pairwise aircraft semantic path sequences; subsequently, obtaining the similarity of the total length of the corresponding common road segments, wherein e=1, 2, 3 . . . . E, and E represents a total number of the plurality of pairwise aircraft semantic path sequences;

Step 23: traversing the plurality of pairwise aircraft semantic path sequences, and repeating steps 21-22, thereby obtaining a total length of the common road segments corresponding to the plurality of pairwise aircraft semantic path sequences; subsequently, generating a similarity matrix of all pairwise aircraft semantic path representations based on the total length of the common road segments corresponding to the plurality of pairwise aircraft semantic path sequences;

Step 24: performing hierarchical clustering on the similarity matrixes of all the pairwise aircraft semantic path representations, thereby obtaining a plurality of aircraft surface taxiing patterns;

Further, in step 22, the total length of the common road segments corresponding to the pairwise aircraft semantic path sequences is expressed as follows:

$$C[T_{m_i}, T_{o_j}] = \begin{cases} 0, & \text{if } i = 0 \text{ else } j = 0 \\ C[T_{m_{i-1}}, T_{o_{j-1}}] + L_{ij}, & \text{if } i, j > 0, m_i = o_j \\ \max\{C[T_{m_i}, T_{o_{j-1}}], C[T_{m_{i-1}}, T_{o_j}]\}, & \text{if } i, j > 0, m_i \neq o_j \end{cases}$$

wherein $C[T_{m_i}, T_{o_j}]$ represents a total length of the common road segments corresponding to the pairwise aircraft semantic path sequences, wherein $T_{m_i}$ represents a road segment length corresponding to the road segment numbered i of an m-th aircraft semantic path representation, namely, up to the m-th aircraft semantic path representation in the pairwise aircraft semantic path sequences, wherein $T_{o_j}$ represents a road segment length corresponding to the road segment numbered j of an o-th aircraft semantic path representation, namely, up to the o-th aircraft semantic path representation in the pairwise aircraft semantic path sequences, wherein mi represents the candidate road segment numbered i of the m-th aircraft semantic path representation, wherein $o_j$ represents the candidate road segment numbered j the o-th aircraft semantic path representation, wherein i=0, 1, 2, . . . I, and I represents a total number of candidate road segments in the m-th aircraft semantic path representation, wherein j=0, 1, 2, . . . J, and J represents a total number of candidate road segments in the o-th aircraft semantic path representation, wherein $C[T_{m_{i-1}}, T_{o_{j-1}}]$ represents a total length of common road segments corresponding to the road segment numbered i−1 of the m-th aircraft semantic path representation and the road segment numbered j−1 of the o-th aircraft semantic path representation, wherein $L_{ij}$ represents a total length of common road segments corresponding to the road segment numbered i of the m-th aircraft semantic path representation and the road segment numbered j of the o-th aircraft semantic path representation, wherein max $\{C[T_{m_i}, T_{o_{j-1}}], C[T_{m_{i-1}}, T_{o_j}]\}$ respectively represent a total length of common road segments corresponding to the road segment numbered i of the m-th aircraft semantic path representation and the road segment numbered j−1 of the o-th aircraft semantic path representation, as well as a total length of common road segments corresponding to the road segment numbered i−1 of the m-th aircraft semantic path representation and the road segment numbered j of the o-th aircraft semantic path representation;

It should be understood that, when the candidate road segment numbered i and the candidate road segment numbered j in the pairwise aircraft semantic path sequences are the same, namely, when $m_i = o_j$, the common road segment length $L_{ij}$ corresponding to a current iteration step is updated based on the common road segment length $C[T_{m_{i-1}},T_{o_{j-1}}]$ corresponding to a previous iteration step, thereby obtaining a total length $C[T_{m_i},T_{o_j}]$ of common road segments corresponding to the current iteration step, wherein if i, j>0,$m_i \neq o_j$, the candidate road segment numbered i and the candidate road segment numbered j in the pairwise aircraft semantic path sequences are different, indicating that there is lack of a common road segment in the current iteration step; at this point, the total length max $\{C[T_{m_i},T_{o_{j-1}}],C[T_{m_{i-1}},T_{o_j}]\}$ of the longest common road segment in the previous iteration step is selected as the total length $C[T_{m_i},T_{o_j}]$ of the final common road segment of the current iteration step;

The similarity of the pairwise aircraft semantic path representations is expressed as:

$$M(T_m, T_o) = \min\left(\frac{M(T_m, T_o)}{M(T_m, T_m)}, \frac{M(T_m, T_o)}{M(T_o, T_o)}\right)$$

wherein $M(T_m,T_o)$ represents a total length of the common road segments of the m-th aircraft semantic path representation and the o-th aircraft semantic path representation, wherein $M(T_m,T_m)$ represents a total length of the own common road segment of the m-th aircraft semantic path representation, namely, the total length of the m-th aircraft semantic path representation, wherein $M(T_o,T_o)$ represents a total length of the own common road segment of the o-th aircraft semantic path representation, namely, the total length of the o-th aircraft semantic path representation, wherein the total length of the common road segments of the pairwise semantic path representations is taken as an upper half of the matrix, the diagonal of the matrix is the own length of the corresponding aircraft semantic path representation, and a lower half of the matrix is the similarity of the pairwise semantic path representations;

Further, specifically, in step 24, performing hierarchical clustering on the similarity matrixes of all the pairwise aircraft semantic path representations to obtain a plurality of aircraft surface taxiing patterns, comprising:

Taking each aircraft semantic path representation as a single cluster, and taking the pairwise aircraft semantic path representations as pairwise clusters;

Obtaining a distance between the corresponding pairwise clusters based on the similarity matrix of the pairwise aircraft semantic path representations, and performing clustering on the nearest clusters (i.e., clusters having the highest similarity) among the pairwise clusters, thereby obtaining a clustering result;

Representing the clustering result as a surface taxiing pattern corresponding to an aircraft semantic path;

It is worth mentioning that, the aircraft surface taxiing pattern is a taxiing pattern in which an aircraft takes off after taxiing to a runway or lands on the runway and taxies to a parking position;

Step 3: constructing a semantic path outlier based on the similarity matrix of the aircraft semantic path representation in step 2 and the plurality of aircraft surface taxiing patterns, and performing outlier detection on the taxiing patterns corresponding to the aircraft semantic path representations to be detected by using the semantic path outlier;

It is worth mentioning that, the aircraft semantic path representations to be detected are aircraft semantic path representations that do not undergo the calculation in step 2;

Specifically, step 3 comprising:

Step 31: performing calculation based on the similarity matrix of the pairwise aircraft semantic path representations in step 23, thereby obtaining a maximum reachable outlier corresponding to each aircraft surface taxiing pattern in step 24, wherein the maximum reachable outlier is used as judgment criteria for outlier detection of aircraft surface taxiing patterns;

Step 32: selecting a b-th to-be-detected aircraft semantic path representation, and respectively obtaining an average similarity of the b-th to-be-detected aircraft semantic path representation and other surface taxiing patterns, thereby obtaining a plurality of average similarities; subsequently, comparing the plurality of average similarities to obtain a maximum average similarity, and calculating an outlier corresponding to the maximum average similarity; comparing the corresponding outlier with the maximum reachable outlier in step 31, and determining whether the surface taxiing pattern corresponding to the b-th to-be-detected aircraft semantic path representation is outlier or not, thereby achieving the outlier taxiing pattern detection;

The judgement criteria for outlier taxiing pattern detection is expressed as:

$$\begin{cases} \text{MAX}(\text{score}_b(T_{P_b})) > O_{\text{Max}}, & T_{P_b} \to \text{Anomal} \\ \text{otherwise}, & T_{P_b} \to \text{Normal} \end{cases}$$

wherein $\text{score}_b(T_{P_b})$ represents an average similarity of the b-th to-be-detected aircraft semantic path representation and other surface taxiing patterns, wherein b=1, 2, 3 . . . . B, and B represents a total number of aircraft semantic path representations to be detected, wherein $T_{P_b}$ represents an aircraft semantic path representation corresponding to the b-th aircraft semantic path representation to be detected, and wherein $O_{Max}$ represents a maximum reachable outlier.

Compared with the prior art, the present invention has the following advantages:

1) According to the present invention, by associating the original field monitoring data with the surface map data, the problems relating to data missing and noise offset are avoided, the continuity and integrity of data are ensured by using the topology information during detection, more regular form of the semantic paths is achieved and easy calculation of similarity relationship between paths is realized, which significantly facilitate the analysis and identification of outlier taxiing patterns;

2) The results of pattern recognition of the present invention are the basis of outlier pattern detection; during detection, after a path similarity matrix is constructed, a hierarchical clustering method is used, which allows the precision of pattern recognition to be adjusted according to actual requirements such that self-adapting surface taxiing pattern recognition is achieved;

3) The present invention considers the conditions of pattern distribution in different airports and the different definitions of outlier patterns; by calculating the average similarity of the patterns, outliers are obtained, and the maximum outlier is taken as the detection criteria for outlier taxiing pattern detection; moreover, by means of a data-driven method, unique and self-adapting outlier detection parameters are established for each airport, ensuring the universality, reliability, and real-time performance of the detection results.

BRIEF DESCRIPTION OF THE DRAWINGS

The drawings are only for the purpose of illustrating specific embodiments and are not intended to limit the present invention.

DETAILED DESCRIPTION

To allow the purposes, features and benefits of the present invention to be better understood, a detailed description of the present invention is provided below in combination with the drawings and specific embodiments. It should be noted that the embodiments of the present invention and the features in the embodiments may be combined with each other without conflict. In addition, to allow the details of the present invention to be better understood, the present invention may also be implemented in other ways different from those described herein. Therefore, the scope of the present invention is not limited by the specific embodiments described below.

Figure 1:
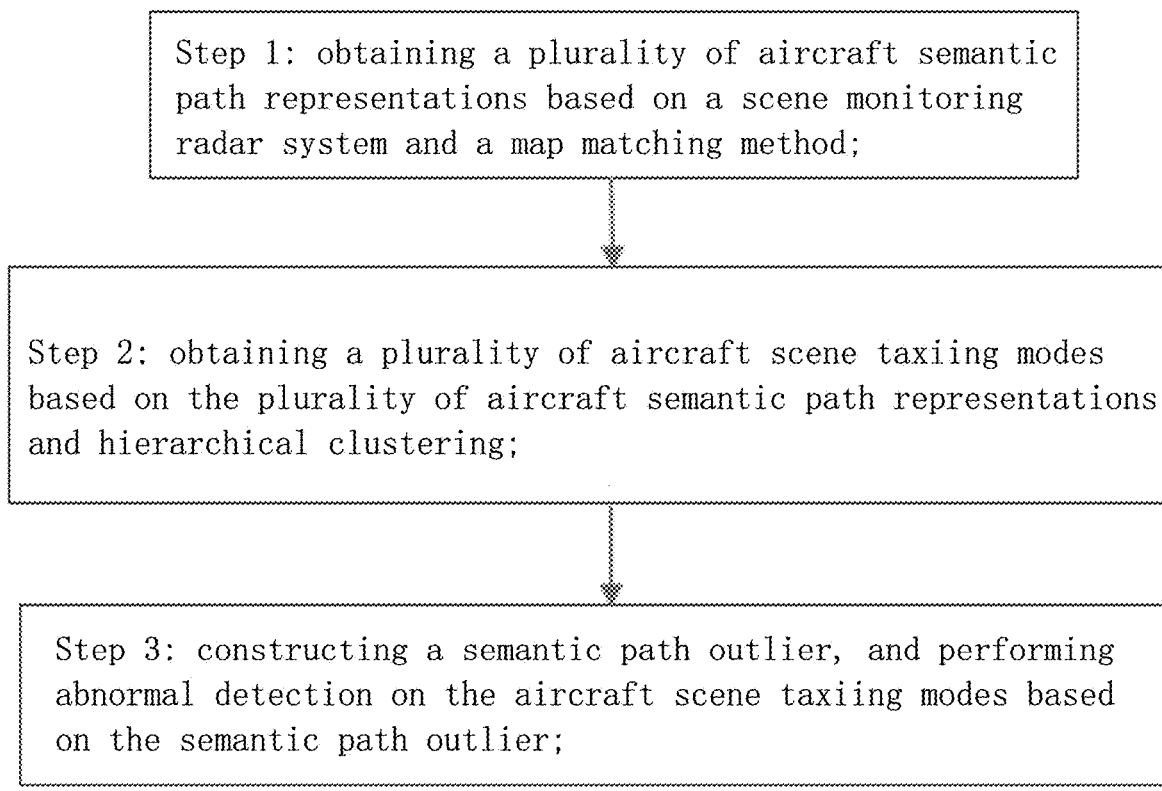
FIG. 1 is a schematic diagram illustrating the airport surface semantic path representation and the outlier taxiing pattern detection method of the present invention.
Figure 2:
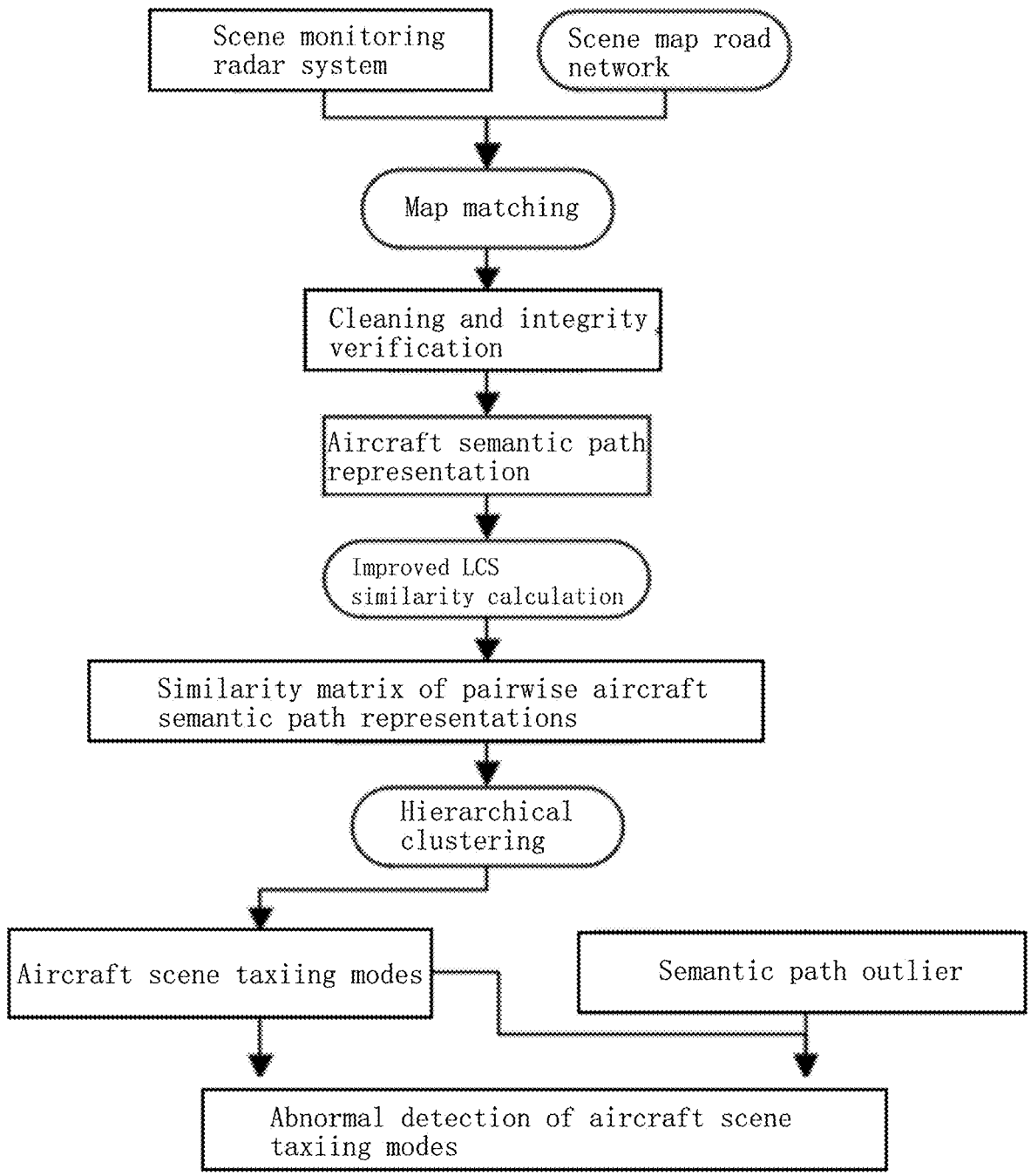
FIG. 2 is a flow chart illustrating the airport surface semantic path representation and the outlier taxiing pattern detection method in the embodiment of the present invention.

In one embodiment of the present invention, referring to FIGS. 1-3, the present invention provides an airport surface semantic path representation and an outlier taxiing pattern detection method. To illustrate the specific implementation of the method of the present invention, the aforesaid technical solution of the present invention is described in detail below in an embodiment. The method of the present invention, comprising the steps of:

Step 1: obtaining a plurality of aircraft initial taxiing paths based on a surface monitoring radar system, and obtaining a plurality of pieces of aircraft taxiing path data by means of map matching by using the plurality of aircraft initial taxiing paths;

Obtaining a plurality of initial aircraft semantic path representations by using the plurality of pieces of aircraft taxiing path data;

Performing cleaning and integrity verification on the plurality of initial aircraft semantic path representations based on the division of parking positions, thereby obtaining a plurality of aircraft semantic path representations;

Preferably, obtaining a plurality of initial aircraft semantic path representations, specifically comprising:

Step 11: obtaining a plurality of aircraft initial taxiing paths based on a surface monitoring radar system under a constraint condition of the aircraft semantic path representations;

It is worth mentioning that, the plurality of aircraft taxiing paths are obtained according to the take-off/landing behaviors;

Establishing airport contour coordinates by means of map matching, and deleting noise path points in the plurality of aircraft initial taxiing paths by using the airport contour coordinates, thereby obtaining a plurality of pieces of aircraft taxiing path data;

Generating a plurality of aircraft taxiing path point sequences based on the plurality of pieces of aircraft taxiing path data;

Step 12: taking all road segments in a road network as candidate road segments, and establishing a candidate road segment set, wherein a first path point in each aircraft taxiing path point sequence starts from a runway end, and each aircraft taxiing path point sequence comprises a plurality of runway ends and parking position ends;

Step 13: selecting a c-th aircraft taxiing path point sequence, wherein c=1, 2, 3 . . . . C, and C represents a total number of aircraft taxiing path point sequences;

Obtaining an initial path point $c_1$ of the c-th aircraft taxiing path point sequence, and obtaining a minimum projection distance from the initial path point $c_1$ to each candidate road segment in the candidate road segment set by means of a Euclidean distance method, thereby obtaining a plurality of projection distances corresponding to the initial path point $c_1$;

Step 14: setting a maximum error distance max of the aircraft semantic path point;

comparing and screening the maximum error distance of the aircraft semantic path point and the plurality of projection distances corresponding to the initial path point $c_1$, and screening out a plurality of candidate projection distances of the initial path point $c_1$;

Sorting the plurality of candidate projection distances of the initial path point $c_1$ to obtain sorted candidate projection distances; representing the minimum candidate projection distance in the sorted candidate projection distances as a road segment matched with the initial path point $c_1$;

Further, the plurality of candidate projection distances of the initial path point $c_1$ are the corresponding candidate projection distances of the initial path point when the plurality of projection distances corresponding to the initial path point $c_1$ are less than the maximum error distance max of the aircraft semantic path point;

Step 15: letting a=1, wherein when a=1, the point is an initial path point, wherein a=1, 2, 3 . . . . A, and A represents a total number of path points of the c-th aircraft taxiing path point sequence;

Step 16: obtaining the path point $c_{a+1}$ of the c-th aircraft taxiing path point sequence; screening out the candidate road segments having a topological relationship with the road segments matched with the trajectory point $c_{a+1}$ by means of the topological information of the road network, thereby obtaining a candidate road segment list;

Obtaining a plurality of projection distances corresponding to the path point $c_{a+1}$ based on the candidate road segment list;

Step 17: comparing, screening and sorting the maximum error distance of the aircraft semantic path point and the plurality of projection distances corresponding to the path point $c_{a+1}$, obtaining sorted candidate projection distances of the path point $c_{a+1}$, and representing a road segment having the shortest candidate projection distance in the sorted candidate projection distances as a matched road segment corresponding to the path point $c_{a+1}$;

Step 18: verifying the matched road segment result corresponding to the path point $c_{a+1}$ by using the constraint condition of the aircraft semantic path representation; if so, obtaining correct matched road segments corresponding to the path point $c_{a+1}$ and entering step 19, and if not, returning to step 17; deleting the matched road segments corresponding to an incorrect path point $c_{a+1}$ from the sorted candidate projection distances of the path point $c_{a+1}$, thereby obtaining the sorted candidate projection distances of an updated path point $c_{a+1}$; subsequently, traversing the sorted candidate projection distances of the updated path point $c_{a+1}$, thereby obtaining correct matched road segments corresponding to the path point $c_{a+1}$;

Step 19: comparing a+1 with A, and if a+1=A, ending the calculation of the aircraft semantic path representation, thereby obtaining matched road segments corresponding to the plurality of path points in the c-th aircraft taxiing path point sequence; generating a complete map matching result of the flight path based on the matched road segments corresponding to the plurality of path points, and performing deduplication processing on the complete map matching result of the flight path, thereby obtaining the c-th initial aircraft semantic path representation; if a+1<A, making a=a+1, and repeating steps 16-19;

Step 20: traversing the plurality of pieces of aircraft taxiing path data, and repeating steps 12-19 to obtain a plurality of initial aircraft semantic path representations;

It should be understood that the initial aircraft semantic flight path is expressed as a previous path point sequence represented by using road segment numbers;

Further, the formula of the projection distance is as follows:

$$D = \sqrt{(x-Q_x)^2 + (y-Q_y)^2}, D < d_{MAX}$$

wherein D represents a projection distance, x represents an x coordinate axis, y represents a y coordinate axis, $Q_x$ represents an x coordinate axis of the projection point Q of the path point on a candidate road segment, $Q_y$ represents a y coordinate axis of the projection point Q of the path point on a candidate road segment, and C represents the maximum error distance $d_{Max}$ of the aircraft semantic path point;

Preferably, the noise path points include all path points in an initial aircraft semantic path representation that are not within an airport range, and the map matching includes a geometric matching algorithm and a topological relationship algorithm;

The constraint condition of the aircraft semantic path representation includes an aircraft steering behavior angle constraint, a long-distance priority straight-going segment skipping constraint, a complex curve interpolation operation, and an anti-interference road segment point skipping constraint;

More specifically, the aircraft steering behavior angle constraint further comprising: aiming at a path point road segment matching in a complex road network at a curve, verifying the connectivity through topological information in a path point road segment matching process, and generating an included angle vector based on the endpoint coordinates; generating a vector included angle cosine value through point multiplication, obtaining a radian value of the included angle by using an inverse cosine function acos, and correcting the rationality of the aircraft steering by using the radian value;

Further, the formula of the aircraft steering behavior angle constraint is as follows:

$$\theta = \arccos \frac{(vF \cdot vB)}{\|vF\| \cdot \|vB\|}, \theta \geq 120°$$

wherein θ represents an aircraft steering angle, vF represents a vector formed by a road segment F by using head-to-tail coordinates, and ∥vF∥ represents a modulus of a corresponding vector of a road segment F, wherein vB represents a vector formed by a road segment B by using head-to-tail coordinates, vF and vB are two connected road segments, and ∥vB∥ represents a modulus of a corresponding vector of a road segment B;

Specifically, the long-distance priority straight-going segment skipping constraint, comprising: aiming at the matching difficulty caused by the low sampling frequency of the field monitoring information, if the matched road segments of adjacent sampling points are not connected in the path point road segment matching process, and when it is judged that the disconnected road segments are straight-going taxiways, performing priority straight-going segment skipping and regarding it as a smooth connection until a continuous matching is executed;

Specifically, the aircraft complex curve interpolation operation, comprising: aiming at the matching difficulty caused by a long sampling interval of an aircraft surface taxiing path at a complex curve, performing interpolation operation between a current path point and a next path point when the straight-going segment skipping cannot be performed, and increasing the density of sampling points to assist in the matching process at the complex curve;

Specifically, the anti-interference road segment point skipping constraint, comprising: aiming at the possible outlier sampling data, directly skipping a path point that cannot be matched, and continuously matching a next path point, wherein the unmatched path point means a deviation of outlier path point coordinates that make the projection distance exceed the maximum error distance of the aircraft semantic path point and result in an interruption in the matching process;

If the matching process is interrupted, returning to the time of the matching result of a previous path point, marking the wrong road segment and searching for a correct road segment again, thereby realizing the correction of the result in step 1, wherein the set frequency of continuous return does not exceed 3 times;

Preferably, in step 1, performing cleaning and integrity verification on the initial aircraft semantic path representations, specifically comprising:

Obtaining aircraft parking positions corresponding to the initial aircraft semantic path representation, and dividing the parking positions into parking position groups, thereby obtaining a plurality of parking position groups; subsequently, pushing the aircrafts in a same parking position group onto a same airport taxiway, and regarding them as a same behavior;

Establishing a key road network node of the parking position group, obtaining a node road segment serial number corresponding to the key road network node when aircrafts are pushed into or pushed out from the parking position group, and deleting the node road segment serial number corresponding to the key road network node when the aircrafts are pushed into or pushed out from the parking position group, thereby realizing the semantic path cleaning in the parking area;

Obtaining an airport runway, and selecting a key road segment at a tail end of the airport runway, thereby realizing the verification of integrity of the aircraft semantic path representation corresponding to the tail end of the runway;

Step 2: using the plurality of aircraft semantic path representations to obtain a similarity matrix of the aircraft semantic path representations, and performing hierarchical clustering on the similarity matrix of the aircraft semantic path representations, thereby obtaining a plurality of aircraft surface taxiing patterns;

Preferably, obtaining a plurality of aircraft surface taxiing patterns, specifically comprising:

Step 21: randomly selecting two aircraft semantic path representations from the plurality of aircraft semantic path representations, thereby forming pairwise aircraft semantic path sequences; subsequently, obtaining a plurality of pairwise aircraft semantic path sequences;

Preferably, the pairwise aircraft semantic path sequences comprise a first aircraft semantic path sequence and a second aircraft semantic path sequence corresponding to any selected two aircraft semantic path representations;

The first aircraft semantic path sequence comprises at least one candidate road segment, a corresponding candidate road segment number and corresponding candidate road segment coordinates;

The second aircraft semantic path sequence also comprises at least one candidate road segment, a corresponding candidate road segment number and corresponding candidate road segment coordinates;

It is worth mentioning that, the number of the candidate road segments in the first aircraft semantic path sequence and the number of candidate road segments in the second aircraft semantic path sequence are equal or unequal;

Step 22: selecting an e-th pairwise aircraft semantic path sequences, and performing calculation based on an improved longest common sub-sequence LCS, thereby obtaining a total length of the common road segments corresponding to the e-th pairwise aircraft semantic path sequences; subsequently, obtaining the similarity of the total length of the corresponding common road segments, wherein e=1, 2, 3 . . . . E, and E represents a total number of the plurality of pairwise aircraft semantic path sequences;

Step 23: traversing the plurality of pairwise aircraft semantic path sequences, and repeating steps 21-22, thereby obtaining a total length of the common road segments corresponding to the plurality of pairwise aircraft semantic path sequences; subsequently, generating a similarity matrix of all pairwise aircraft semantic path representations based on the total length of the common road segments corresponding to the plurality of pairwise aircraft semantic path sequences;

Step 24: performing hierarchical clustering on the similarity matrixes of all the pairwise aircraft semantic path representations, thereby obtaining a plurality of aircraft surface taxiing patterns;

Further, in step 22, the total length of the common road segments corresponding to the pairwise aircraft semantic path sequences is expressed as follows:

$$C[T_{m_i}, T_{o_j}] = \begin{cases} 0, & \text{if } i=0 \text{ else } j=0 \\ C[T_{m_{i-1}}, T_{o_{j-1}}] + L_{ij}, & \text{if } i,j>0, m_i=o_j \\ \max\{C[T_{m_i}, T_{o_{j-1}}], C[T_{m_{i-1}}, T_{o_j}]\}, & \text{if } i,j>0, m_i \neq o_j \end{cases}$$

wherein $C[T_{m_i}, T_{o_j}]$ represents a total length of the common road segments corresponding to the pairwise aircraft semantic path sequences, wherein $T_{m_i}$ represents a road segment length corresponding to the road segment numbered i of an m-th aircraft semantic path representation, namely, up to the m-th aircraft semantic path representation in the pairwise aircraft semantic path sequences, wherein $T_{o_j}$ represents a road segment length corresponding to the road segment numbered j of an o-th aircraft semantic path representation, namely, up to the o-th aircraft semantic path representation in the pairwise aircraft semantic path sequences, wherein $m_i$ represents the candidate road segment numbered i of the m-th aircraft semantic path representation, wherein $o_j$ represents the candidate road segment numbered j the o-th aircraft semantic path representation, wherein i=0, 1, 2, . . . I, and I represents a total number of candidate road segments in the m-th aircraft semantic path representation, wherein j=0, 1, 2, . . . J, and J represents a total number of candidate road segments in the o-th aircraft semantic path representation, wherein $C[T_{m_{i-1}}, T_{o_{j-1}}]$ represents a total length of common road segments corresponding to the road segment numbered i−1 of the m-th aircraft semantic path representation and the road segment numbered j−1 of the o-th aircraft semantic path representation, wherein $L_{ij}$ represents a total length of common road segments corresponding to the road segment numbered i of the m-th aircraft semantic path representation and the road segment numbered j of the o-th aircraft semantic path representation, wherein $\max\{C[T_{m_i}, T_{o_{j-1}}], C[T_{m_{i-1}}, T_{o_j}]\}$ respectively represent a total length of common road segments corresponding to the road segment numbered i of the m-th aircraft semantic path representation and the road segment numbered j−1 of the o-th aircraft semantic path representation, as well as a total length of common road segments corresponding to the road segment numbered i−1 of the m-th aircraft semantic path representation and the road segment numbered j of the o-th aircraft semantic path representation;

It should be understood that, when the candidate road segment numbered i and the candidate road segment numbered j in the pairwise aircraft semantic path sequences are the same, namely, when $m_i=o_j$, the common road segment length $L_{ij}$ corresponding to a current iteration step is updated based on the common road segment length $C[T_{m_{i-1}}, T_{o_{j-1}}]$ corresponding to a previous iteration step, thereby obtaining a total length $C[T_{m_i}, T_{o_j}]$ of common road segments corresponding to the current iteration step, wherein if i, j>0, $m_i \neq o_j$, the candidate road segment numbered i and the candidate road segment numbered j in the pairwise aircraft semantic path sequences are different, indicating that there is lack of a common road segment in the current iteration step; at this point, the total length $\max\{C[T_{m_i}, T_{o_{j-1}}], C[T_{m_{i-1}}, T_{o_j}]\}$ of the longest common road segment in the previous iteration step is selected as the total length $C[T_{m_i}, T_{o_j}]$ of the final common road segment of the current iteration step;

The similarity of the pairwise aircraft semantic path representations is expressed as:

$$M(T_m, T_o) = \min\left(\frac{M(T_m, T_o)}{M(T_m, T_m)}, \frac{M(T_m, T_o)}{M(T_o, T_o)}\right)$$

wherein $M(T_m, T_o)$ represents a total length of the common road segments of the m-th aircraft semantic path representation and the o-th aircraft semantic path representation, wherein $M(T_m, T_m)$ represents a total length of the own common road segment of the m-th aircraft semantic path representation, namely, the total length of the m-th aircraft semantic path representation, wherein $M(T_o, T_o)$ represents a total length of the own common road segment of the o-th aircraft semantic path representation, namely, the total length of the o-th aircraft semantic path representation, wherein the total length of the common road segments of the pairwise semantic path representations is taken as an upper half of the matrix, the diagonal of the matrix is the own length of the corresponding aircraft semantic path representation, and a lower half of the matrix is the similarity of the pairwise semantic path representations;

Further, specifically, in step 24, performing hierarchical clustering on the similarity matrixes of all the pairwise aircraft semantic path representations to obtain a plurality of aircraft surface taxiing patterns, comprising:

Taking each aircraft semantic path representation as a single cluster, and taking the pairwise aircraft semantic path representations as pairwise clusters;

Obtaining a distance between the corresponding pairwise clusters based on the similarity matrix of the pairwise aircraft semantic path representations, and performing clustering on the nearest clusters (i.e., clusters having the highest similarity) among the pairwise clusters, thereby obtaining a clustering result;

Representing the clustering result as a surface taxiing pattern corresponding to an aircraft semantic path;

It is worth mentioning that, the aircraft surface taxiing pattern is a taxiing pattern in which an aircraft takes off after taxiing to a runway or lands on the runway and taxies to a parking position;

Step 3: constructing a semantic path outlier based on the similarity matrix of the aircraft semantic path representation in step 2 and the plurality of aircraft surface taxiing patterns, and performing outlier detection on the taxiing patterns corresponding to the aircraft semantic path representations to be detected by using the semantic path outlier;

It is worth mentioning that, the aircraft semantic path representations to be detected are aircraft semantic path representations that do not undergo the calculation in step 2;

Specifically, step 3 comprising:

Step 31: performing calculation based on the similarity matrix of the pairwise aircraft semantic path representations in step 23, thereby obtaining a maximum reachable outlier corresponding to each aircraft surface taxiing pattern in step 24, wherein the maximum reachable outlier is used as judgment criteria for outlier detection of aircraft surface taxiing patterns;

Step 32: selecting a b-th to-be-detected aircraft semantic path representation, and respectively obtaining an average similarity of the b-th to-be-detected aircraft semantic path representation and other surface taxiing patterns, thereby obtaining a plurality of average similarities; subsequently, comparing the plurality of average similarities to obtain a maximum average similarity, and calculating an outlier corresponding to the maximum average similarity; comparing the corresponding outlier with the maximum reachable outlier in step 31, and determining whether the surface taxiing pattern corresponding to the b-th to-be-detected aircraft semantic path representation is outlier or not, thereby achieving the outlier taxiing pattern detection;

The judgement criteria for outlier taxiing pattern detection is expressed as:

$$\begin{cases} \text{MAX}(\text{score}_b(T_{P_b})) > O_{\text{Max}}, & T_{P_b} \to \text{Anomal} \\ \text{otherwise}, & T_{P_b} \to \text{Normal} \end{cases}$$

wherein $\text{score}_b(T_{P_b})$ represents an average similarity of the b-th to-be-detected aircraft semantic path representation and other surface taxiing patterns, wherein b=1, 2, 3 . . . . B, and B represents a total number of aircraft semantic path representations to be detected, wherein $T_{P_b}$ represents an aircraft semantic path representation corresponding to the b-th aircraft semantic path representation to be detected, and wherein $O_{Max}$ represents a maximum reachable outlier.

The above is merely a preferred embodiment of the present invention, and the scope of the present invention is not limited to this. Any changes or replacements made by those skilled in the art within the scope of the disclosed technology of the present invention shall fall into the scope defined by the claims of the present invention.

The invention claimed is:

1. An airport surface semantic path representation and outlier taxiing pattern detection method, comprising:

step 1: obtaining a plurality of initial aircraft semantic flight path representations based on a surface monitoring radar system and a map matching method, and performing cleaning and integrity verification on the plurality of initial aircraft semantic path representations based on the division of parking positions, thereby obtaining a plurality of aircraft semantic path representations;

step 2: using the plurality of aircraft semantic path representations to obtain a similarity matrix of the aircraft semantic path representations, and performing hierarchical clustering on the similarity matrix of the aircraft semantic path representations, thereby obtaining a plurality of aircraft surface taxiing patterns;

step 3: constructing a semantic path outlier based on the similarity matrix of the aircraft semantic path representation in step 2 and the plurality of aircraft surface taxiing patterns, and performing outlier detection on the taxiing patterns corresponding to the aircraft semantic path representations to be detected by using the semantic path outlier.

2. The detection method of claim 1, wherein obtaining a plurality of initial aircraft semantic path representations, specifically comprising:

step 11: establishing aircraft semantic path representation constraint conditions, and obtaining a plurality of aircraft taxiing path point sequences based on the surface monitoring radar system and airport map contour coordinates;

step 12: taking all road segments in a road network as candidate road segments, and establishing a candidate road segment set;

step 13: selecting a c-th aircraft taxiing path point sequence, wherein c=1, 2, 3 . . . C, and C represents a total number of aircraft taxiing path point sequences; obtaining a plurality of projection distances that an initial path point $c_1$ corresponds to each candidate road segment in the candidate road segment set based on a Euclidean distance method;

step 14: setting a maximum error distance of the aircraft semantic path point; obtaining a matched road segment corresponding to the initial path point $c_1$ based on the maximum error distance of the aircraft semantic path point and the plurality of projection distances corresponding to the initial path point $c_1$;

step 15: making a=1, wherein when a=1, the point is an initial path point;

step 16: obtaining the path point $c_{a+1}$ of the c-th aircraft taxiing path point sequence;

screening out the candidate road segments having a topological relationship with the road segments matched with the trajectory point $c_{a+1}$ by means of the topological information of the road network, thereby obtaining a plurality of projection distances corresponding to the path point $c_{a+1}$;

step 17: obtaining a matched road segment corresponding to the path point $c_{a+1}$ based on the maximum error distance of the aircraft semantic path point and the plurality of projection distances corresponding to the initial path point $c_{a+1}$;

step 18: verifying the matched road segment result corresponding to the path point $c_{a+1}$ by using the constraint condition of the aircraft semantic path representation, thereby obtaining a correct matched road segment corresponding to the path point $c_{a+1}$;

step 19: comparing a+1 with A, wherein A represents a total number of path points of the aircraft taxiing path point sequence c, wherein if a+1=A, ending the calculation of the aircraft semantic path representation to obtain an initial aircraft semantic path representation corresponding to the c-th aircraft taxiing path point sequence, and if a+1<A, making a=a+1, and repeating steps 16-19;

step 20: traversing the plurality of aircraft taxiing path point sequences, and repeating steps 12-19 to obtain a plurality of initial aircraft semantic path representations.

3. The detection method of claim 2, wherein the map matching is a geometric matching algorithm or a topological relation algorithm.

4. The detection method of claim 1, wherein the constraint condition of the aircraft semantic path representation comprises:
an aircraft steering behavior angle constraint, an aircraft long-distance priority straight-going segment skipping constraint, an aircraft complex curve interpolation operation, and an aircraft anti-interference road segment point skipping constraint.

5. The detection method of claim 4, wherein the aircraft steering behavior angle constraint is expressed as follows:

$$\theta = \arccos\frac{(vF \cdot vB)}{\|vF\| \cdot \|vB\|}, \theta \geq 120°$$

wherein θ represents an aircraft steering angle, vF represents a vector formed by a road segment F by using head-to-tail coordinates, and ∥vD∥ represents a modulus of a corresponding vector of a road segment F, wherein vB represents a vector formed by a road segment B by using head-to-tail coordinates, vF and vB are two connected road segments, and ∥vB∥ represents a modulus of a corresponding vector of a road segment B.

6. The detection method of claim 2, wherein obtaining a plurality of aircraft surface taxiing patterns, specifically comprising:

step 21: randomly selecting two aircraft semantic path representations from the plurality of aircraft semantic path representations, thereby forming pairwise aircraft semantic path sequences; subsequently, obtaining a plurality of pairwise aircraft semantic path sequences;

step 22: selecting an e-th pairwise aircraft semantic path sequences, and performing calculation based on an improved longest common sub-sequence LCS, thereby obtaining a total length of the common road segments corresponding to the e-th pairwise aircraft semantic path sequences; subsequently, obtaining the similarity of the total length of the corresponding common road segments, wherein e=1, 2, 3 . . . E, and E represents a total number of the plurality of pairwise aircraft semantic path sequences;

step 23: traversing the plurality of pairwise aircraft semantic path sequences, and repeating steps 21-22, thereby obtaining a total length of the common road segments corresponding to the plurality of pairwise aircraft semantic path sequences; subsequently, generating a similarity matrix of all pairwise aircraft semantic path representations based on the total length of the common road segments corresponding to the plurality of pairwise aircraft semantic path sequences;

step 24: performing hierarchical clustering on the similarity matrixes of all the pairwise aircraft semantic path representations, thereby obtaining a plurality of aircraft surface taxiing patterns.

7. The detection method of claim 2, wherein the total length of the common road segments corresponding to the pairwise aircraft semantic path sequences is expressed as follows:

$$C[T_{m_i}, T_{o_j}] = \begin{cases} 0, & \text{if } i = 0 \text{ else } j = 0 \\ C[T_{m_{i-1}}, T_{o_{j-1}}] + L_{ij}, & \text{if } i, j > 0, m_i = o_j \\ \max\{C[T_{m_i}, T_{o_{j-1}}], C[T_{m_{i-1}}, T_{o_j}]\}, & \text{if } i, j > 0, m_i \neq o_j \end{cases}$$

wherein $C[T_{m_i}, T_{o_j}]$ represents a total length of the common road segments corresponding to the pairwise aircraft semantic path sequences, wherein $T_{m_i}$ represents a road segment length corresponding to the road segment numbered i of an m-th aircraft semantic path representation, wherein $T_{o_j}$ represents a road segment length corresponding to the road segment numbered j of an o-th aircraft semantic path representation, wherein $m_i$ represents the candidate road segment numbered i of the m-th aircraft semantic path representation, wherein $o_j$ represents the candidate road segment numbered j the o-th aircraft semantic path representation, wherein i=0, 1, 2, . . . I, and I represents a total number of candidate road segments in the m-th aircraft semantic path representation, wherein j=0, 1, 2, . . . J, and J represents a total number of candidate road segments in the o-th aircraft semantic path representation, wherein $C[T_{m_{i-1}}, T_{o_{j-1}}]$ represents a total length of common road segments corresponding to the road segment numbered i−1 of the m-th aircraft semantic path representation and the road segment numbered j−1 of the o-th aircraft semantic path representation, wherein $L_{ij}$ represents a total length of common road segments corresponding to the road segment numbered i of the m-th aircraft semantic path representation and the road segment numbered j of the o-th aircraft semantic path representation, wherein $\max\{C[T_{m_i}, T_{o_{j-1}}], C[T_{m_{i-1}}, T_{o_j}]\}$ respectively represent a total length of common road segments corresponding to the road segment numbered i of the m-th aircraft semantic path representation and the road segment numbered j−1 of the o-th aircraft semantic path representation, as well as a total length of common road segments corresponding to the road segment numbered i−1 of the m-th aircraft semantic path representation and the road segment numbered j of the o-th aircraft semantic path representation.

8. The detection method of claim 7, wherein the similarity of the total length of the corresponding common road segments is expressed as:

$$M(T_m, T_o) = \min\left(\frac{M(T_m, T_o)}{M(T_m, T_m)}, \frac{M(T_m, T_o)}{M(T_o, T_o)}\right)$$

wherein $M(T_m, T_o)$ represents a total length of the common road segments of the m-th aircraft semantic path representation and the o-th aircraft semantic path representation, wherein $M(T_m, T_m)$ represents a total length of the own common road segment of the m-th aircraft semantic path representation, and wherein $M(T_o, T_o)$ represents a total length of the own common road segment of the o-th aircraft semantic path representation.

9. The detection method of claim 8, wherein performing the outlier detection, specifically comprising:

Step 31: performing calculation based on the similarity matrix of the pairwise aircraft semantic path representations in step 23, thereby obtaining a maximum reachable outlier corresponding to each aircraft surface taxiing pattern in step 24;

Step 32: selecting a b-th to-be-detected aircraft semantic path representation, and respectively obtaining an average similarity of the b-th to-be-detected aircraft semantic path representation and other surface taxiing patterns, thereby obtaining a plurality of average similarities; subsequently, comparing the plurality of average similarities to obtain a maximum average similarity, and calculating an outlier corresponding to the maximum average similarity; comparing the corresponding outlier with the maximum reachable outlier in step 31, and determining whether the surface taxiing pattern corresponding to the b-th to-be-detected aircraft semantic path representation is outlier or not, thereby achieving the outlier taxiing pattern detection.

* * * * *